United States Patent [19]

Mathis et al.

[11] Patent Number: 5,311,195
[45] Date of Patent: May 10, 1994

[54] COMBINED RELATIVE AND ABSOLUTE POSITIONING METHOD AND APPARATUS

[75] Inventors: Darrell L. Mathis, San Francisco; Richard F. Poppen, San Jose; Kenneth A. Milnes, Fremont, all of Calif.

[73] Assignee: Etak, Inc., Menlo Park, Calif.

[21] Appl. No.: 753,190

[22] Filed: Aug. 30, 1991

[51] Int. Cl.⁵ .................. H04B 7/185; G01S 5/02
[52] U.S. Cl. .................. 342/357; 342/389; 342/451; 342/454; 342/457; 342/463
[58] Field of Search .............. 342/352, 357, 388, 389, 342/391, 396, 397, 417, 419, 420, 450, 451, 453, 454, 457, 463, 464, 465

[56] References Cited

U.S. PATENT DOCUMENTS

| | | | |
|---|---|---|---|
| 3,940,597 | 2/1976 | DiMatteo | 342/456 X |
| 4,232,313 | 11/1980 | Fleishman | 342/36 |
| 4,796,191 | 1/1989 | Honey et al. | 364/450 |
| 4,876,550 | 10/1989 | Kelly | 342/451 |
| 4,899,285 | 2/1990 | Nakayama et al. | 364/453 |
| 4,949,268 | 8/1990 | Nishikawa et al. | 364/449 |
| 4,954,833 | 9/1990 | Evans et al. | 342/357 |
| 5,075,693 | 12/1991 | McMillan et al. | 342/457 |
| 5,093,839 | 3/1992 | Kohno et al. | 375/1 |
| 5,111,209 | 5/1992 | Toriyama | 342/357 |
| 5,119,102 | 6/1992 | Barnard | 342/357 |
| 5,185,610 | 2/1993 | Ward et al. | 342/357 |

*Primary Examiner*—John B. Sotomayor
*Attorney, Agent, or Firm*—Fliesler, Dubb, Meyer & Lovejoy

[57] ABSTRACT

A navigation system comprising a relative positioning system (RPS) with dead reckoning and map matching and an absolute positioning system (APS) is provided and operated in such a manner that APS position information is used for updating RPS position and contour of equal probability (CEP) information as required. The APS may comprise a Loran-C or a global positioning system (GPS). Different criteria are used for resetting the RPS depending on whether or not the navigation system comprises a Loran-C or a GPS due to the different levels of precision of the Loran-C and the GPS. When the RPS is reset or updated, it is updated to the current APS position with its offset, if any. Its contour of equal probability (CEP) may also be adjusted.

57 Claims, 4 Drawing Sheets

| NUMBER OF SATELLITES | $f_1$ |
|---|---|
| <3 | ∞ |
| 3 | $60_M$ X DOP |
| >3 | $30_M$ X DOP |

FIG. 5  GPC CEP

| | NUMBER OF SATELLITES | RPS LOST | RPS NOT LOST |
|---|---|---|---|
| $W_1$ { | <3 | ∞ | ∞ |
| | 3 | GPS CEP | ∞ |
| | >3 | GPS CEP | 2 X GPS CEP |

FIG. 6  GPS AREA

COMBINED RELATIVE AND ABSOLUTE POSITIONING METHOD AND APPARATUS

BACKGROUND OF THE INVENTION

1. Field of the Invention

The present invention relates in general to land-based vehicular navigation apparatus and in particular to a method and apparatus comprising the combination of a relative positioning system (RPS), such as a vehicular dead reckoning navigation system with map-matching and an absolute positioning system (APS), such as a Loran-C system or a Global Positioning System (GPS), the latter systems being used to automatically reposition and recalibrate the RPS as required.

2. Description of Prior Art

Generally, there are several methods and systems used to navigate a vehicle over land, each with its advantages and disadvantages. Examples include a relative positioning system (RPS), such as a dead reckoning system or a dead reckoning system with map matching, and an absolute positioning system (APS), such as a Loran-C system or a Global Positioning System (GPS).

A conventional dead reckoning system with map matching, such as disclosed in U.S. Pat. No. 4,796,191, entitled Vehicle Navigational System and Method, and assigned to the assignee of the present application, has a number of advantages. It can operate in a fully self-contained way, requiring no equipment outside the vehicle in which it is used. It typically has high accuracy over significant intervals of time. It is linked to an electronic map of roads which can automatically eliminate minor vehicular position errors and measurement noise and provide a graphical user display. For example, as a vehicle using such a system moves, onboard wheel sensors, a magnetic compass and/or other sensing means computes the vehicle's position using dead reckoning techniques. The computed position is compared frequently with an electronically stored map of roads. If the computed position does not correspond to a location on the nearest appropriate road, the system automatically corrects the vehicle's position to place it on that nearest road.

The above-described dead reckoning navigation apparatus, however, has a number of disadvantages. One of the disadvantages is that sometimes navigation performance can degrade if the map matching relocates the vehicle's position to an incorrect road. This can occur because of an extreme anomalous magnetic field, wheel slippage or map errors. Another disadvantage arises if the difference between the computed vehicle position and the nearest appropriate road is too large, i.e. exceeds a predetermined allowable error estimate. Under these circumstances the dead reckoning system will not update its position. Once an incorrect update has been made or the errors become too large, precision navigation may not be automatically regained without manual intervention.

Another disadvantage of conventional dead reckoning navigation apparatus is that it typically requires that the operation of the system be visually monitored by the operator and manually calibrated and that, after calibration, correct initial position information be entered manually.

Some absolute navigation systems, such as those based on reception of Loran-C or GPS signals, have the advantage of providing high precision, at least some of the time, the ability to regain high precision position information after the loss of a signal, the ability to provide correct initial position information and the capability to be automatically calibrated.

Such systems, however, also have a number of disadvantages. For example, signal dropouts can leave a vehicle without any navigation information beyond the position computed before the dropout. There can be an offset, such as imposed by the selective availability of GPS, as well as transmitter and receiver clock timing differences and the like which can be quite large, e.g. hundreds of meters in the case of Loran-C. Moreover, there is no link to a map database. Thus, even if positions are plotted on a map electronically or otherwise, measurement errors, e.g. jitter, will be apparent. Also, without a link to a map database, no link to a road network is available to provide path computations and advanced user interfaces.

SUMMARY OF THE INVENTION

In view of the foregoing, principal objects of the present invention are a method and apparatus comprising a relative positioning system (RPS), such as the above-described dead reckoning system with map matching and an absolute positioning system (APS), such as Loran-C or GPS, which are combined in a way to use their advantages while minimizing their disadvantages.

An important feature of the RPS of the present invention is that it provides information on the validity of the RPS position information, such as a "lost" flag indicator as well as an RPS contour of equal probability (CEP) which is a measure of the precision of the RPS. Both of these features are used to advantage in operating the combined RPS and APS of the present invention.

While the combined RPS and APS of the present invention is not fully self-contained, i.e. wholly onboard the vehicle, it can operate in a self-contained mode and thereby eliminate the signal dropout disadvantage of a pure absolute positioning system while maintaining the high apparent accuracy of a map matching relative positioning system. By using the absolute position information of the APS, the system of the present invention has the ability to automatically reposition the RPS and its CEP if map matching update errors occur or if large errors occur. Moreover the automatic calibration of the APS can be used to automatically calibrate the RPS and thereby increase its accuracy and to compute a correction that can eliminate APS offsets and thus eliminate the need for operator intervention.

The present invention accomplishes the above advantages and others by using the absolute navigation apparatus to provide update information when the dead reckoning and map matching system determines that it has made an update error and/or is lost, e.g. generates a "lost" flag indicator, or the difference in position computed by the RPS and APS exceeds predetermined limits.

Specifically, when the dead reckoning and map matching system is updating to the correct road the combined system will perform with the accuracy of map matching without the need for operator intervention.

During the operation of the combined system, the AP portion of the system is continuously monitored to check for error conditions which the receiver can detect and for stability. This typically includes an evaluation of various statistical parameters. The APS's position information is considered valid if it passes certain checks. In addition, the difference between the APS's position and the RPS's position is monitored over time to calculate an average offset. This average offset is updated periodically as long as the RPS's position is judged to be valid.

When the RPS's position is judged to be invalid, e.g. due to an improper update or the lack of an update over a long distance, and/or a "lost" flag indicator is generated and the current APS's position information is judged to be valid, a new vehicle RPS position and RPS CEP is computed from the current APS's position and the calculated offset. If the RPS continues to provide invalid updates the above process is repeated. Eventually, the vehicle will leave the conditions, e.g. extreme magnetic anomaly, tire slippage, or the like, that caused the problem. During the time of the problem, the errors are bounded by the accuracy of the APS. Beyond the problem time, the APS updates enable the RPS to automatically regain map matching performance. On the other hand, if the APS's receiver loses the signal the system still is able to use the RPS positions.

A further advantage of the present invention is that it does not assign a weight to the current position information obtained from the RPS and the APS so as to compute a current position in between as is typically done in prior known navigation systems. Thus, the present invention either retains the current RPS position information and CEP or updates the current RPS position information and CEP to the current APS position information, including any offset, if the latter is deemed to be more accurate.

BRIEF DESCRIPTION OF THE DRAWINGS

The above and other objects, features and advantages of the present invention will become apparent from the following detailed description of the accompanying drawings in which.

DETAILED DESCRIPTION OF THE DRAWINGS

Figure 1:
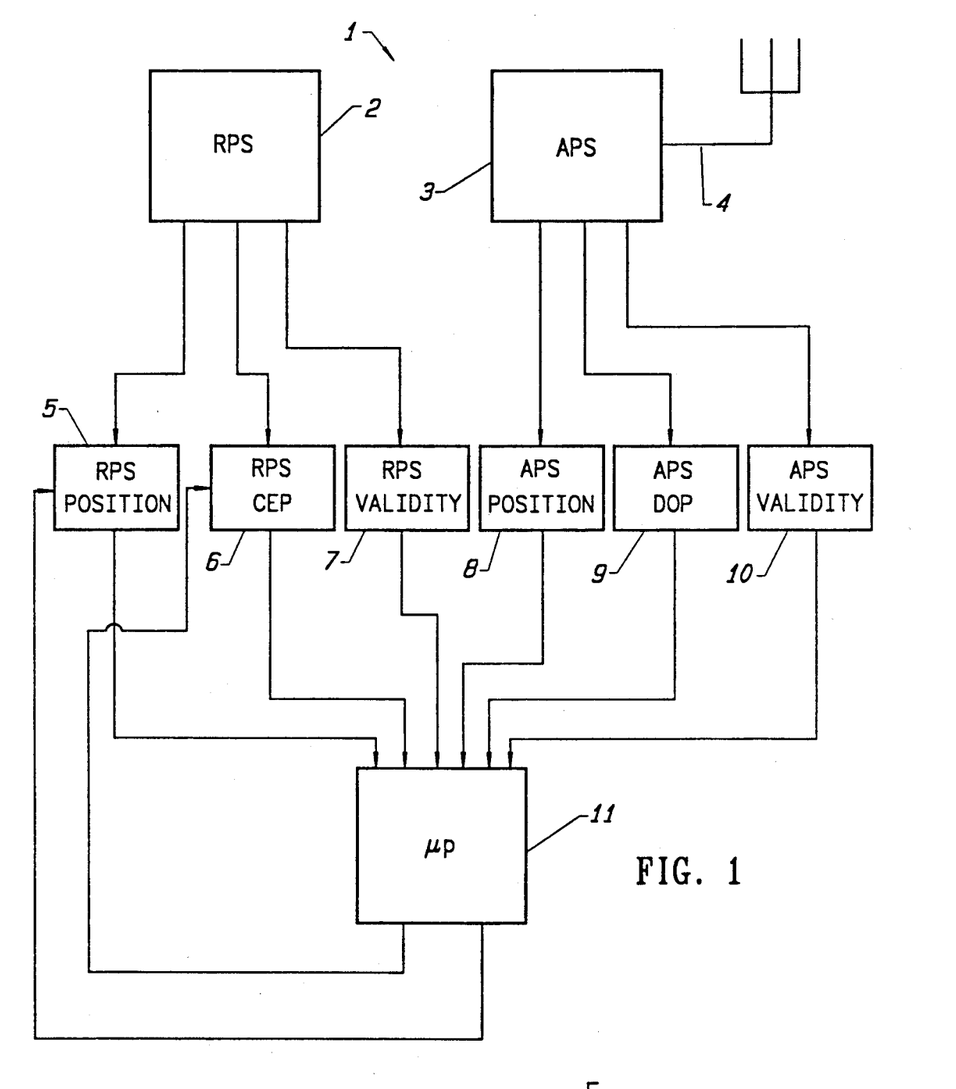
FIG. 1 is a block diagram of a navigation system according to the present invention.

Referring to FIG. 1, there is provided in accordance with the present invention a navigation system designated generally as 1. In the system 1 there is provided a relative positioning system (RPS) 2 and an absolute positioning system (APS) receiver 3. The RPS 2 comprises a conventional dead-reckoning navigation system with map matching such as disclosed in U.S. Pat. No. 4,796,191. The APS 3 comprises a conventional Loran-C or Global Positioning System (GPS) receiver. The APS receiver 3 is linked to ground-based transmitters or space-based satellite transmitters by means of an antenna 4.

In the RPS 2 there is provided a register 5 for storing and reporting RPS computed positions of a vehicle, typically in terms of latitude and longitude, a register 6 for storing RPS error estimate information (RPS CEP) associated with the RPS computed positions of a vehicle and a register 7 for storing RPS validity information, such as a "lost" flag indicator when the RPS computes it is lost. In the APS 3 there is provided a register 8 for storing and reporting APS computed positions of a vehicle, typically in terms of latitude and longitude, a register 9 for storing an APS error estimate, sometimes identified as a dilution of position error estimate factor (DOP) associated with the APS computed positions of a vehicle, and a register 10 for storing APS validity information, such as an APS indicator indicating that the APS position information should or should not be relied on. The contents of the registers 5-10 are processed in a microprocessor 11, or the like, for providing outputs to registers 5 and 6 for updating the current RPS computed position of a vehicle and RPS CEP data, as will be further described below. It may be noted, however, that the RPS 2 and/or the APS 3 or parts thereof may be embodied within the microprocessor 11. That is, the microprocessor 11 can also be used to perform RPS and APS computations.

As described above, the RPS computed position of a vehicle and the APS computed position of a vehicle each has associated therewith a contour of equal probability (CEP) and/or a dilution of precision of position error (DOP).

The DOP is a dimensionless factor, the magnitude of which depends on the arrangement of GPS transmitters used for obtaining a reported GPS position and its direction from the reported position. It is the factor by which a CEP, described below, associated with an ideal arrangement of APS signal transmitters is modified as a result of a less than ideal arrangement of said transmitters. For example, if the arrangement of transmitters used for obtaining a reported position is ideal, by definition, DOP may be set equal to 1 in all directions from the reported position. If, on the other hand, the arrangement of transmitters used for obtaining a reported position is less than ideal, the magnitude of DOP may be equal to 1.3 in one direction from the reported position and may be equal to 2.0 in a direction 90 degrees therefrom.

Associated with and surrounding each reported APS and RPS position there is a probability distribution. The contour of equal probability (CEP) is a contour chosen so that the probability associated with the area inside the contour is some fixed fraction, e.g. 95%, of the probability distribution. For purposes of simplifying the mathematical computations, the CEP may be chosen to be an ellipse, a rectangle, a parallelogram, or some other shape.

In general, the CEP associated with current position information from an RPS and an APS is a measure of the reliability, stability and precision of the RPS and the APS.

Figure 2:
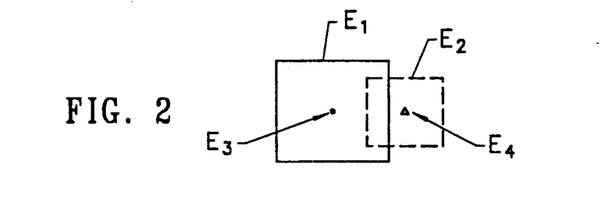
FIG. 2 is a diagram illustrating contours of equal probability (CEP) for an APS and an RPS.

Referring to FIG. 2, there is shown a pair of box-shaped areas defined by the lines $E_1$ and $E_2$, a dot $E_3$ and an arrowhead $E_4$. The box-shaped area $E_1$ represents the CEP or contour of equal probability of a vehicle's position as determined by the APS. The box-shaped area $E_2$ represents the CEP or contour of equal probability of the position of a vehicle as computed by the RPS. The dot $E_3$ and arrowhead $E_4$ represent the APS and RPS reported postions of a vehicle, respectively.

Depending upon the validity, reliability, precision and stability of the APS, the vehicle's RPS computed position may be relocated to correspond to the position given by the APS and any associated offset and its RPS CEP set to equal the CEP of the APS or some fraction or multiple thereof, as will be further described below.

Figure 3:
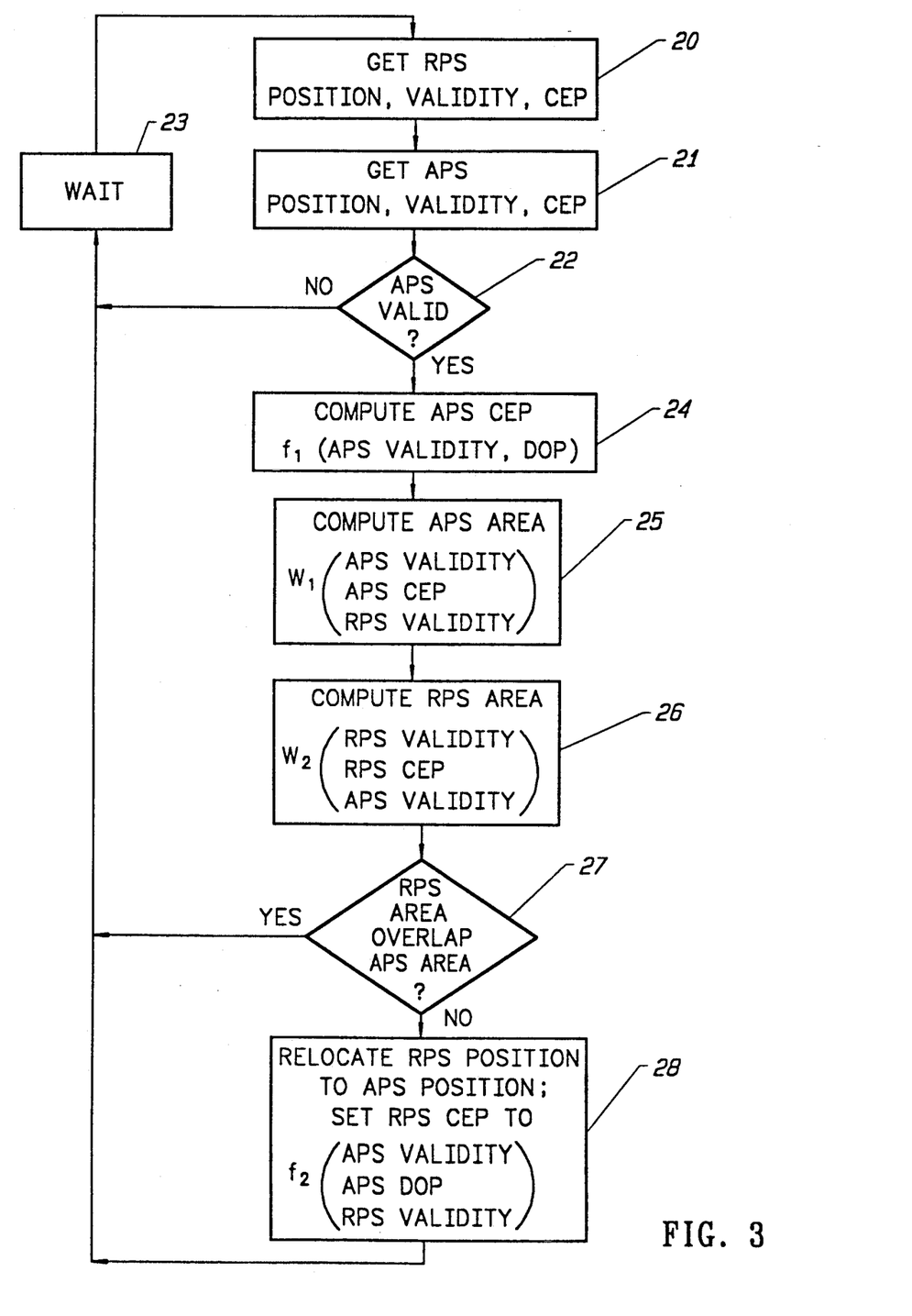
FIG. 3 is a flow diagram of a method of operating a navigation system comprising a relative positioning system (RPS) and an absolute positioning system (APS) according to the present invention.

Referring to FIG. 3, there is shown a flow diagram of a method of operating the navigation system of FIG. 1 according to the present invention. As described above, in the navigation system 1 there is provided a relative positioning system (RPS) and an absolute position system (APS). In the RPS there is included a means for providing map-matching and current RPS position information. The RPS position information includes the current RPS computed position of a vehicle, an indication of whether or not said current RPS position information is valid, e.g. an RPS "lost" flag indicator when said RPS computes it is lost, and an RPS position error estimate (RPS CEP). The APS includes a means for providing current APS position information. The APS position information includes the current APS computed position of a vehicle, an indication of whether or not said current APS position information is valid and a dilution of precision of position error factor (DOP). As will be seen the DOP is closely related to contours of equal probability (CEP).

In operating the navigation system according to the present invention current RPS position information and current APS position information is acquired from the RPS and APS (Blocks 20,21). The current RPS position information includes the current computed RPS position of a vehicle, an RPS validity indicator, for example, a "lost" flag indicator, when said RPS computes it is lost, and an RPS position error estimate (RPS CEP). The APS position information includes the current computed APS position of a vehicle, an indication of whether or not said current APS position information is valid and a dilution of precision of position error factor (DOP). After acquiring the current RPS and APS position information, the system checks the indication of whether or not said current APS information is valid (Block 22). If the current APS position information is not valid, the system waits for a predetermined interval of time, e.g. two seconds, (Block 23) then acquires the then current or new RPS and APS position information (Block 20,21). If the then current APS position information is valid, the system computes an APS error estimate (APS CEP) which is equal to a function $f_1$ of APS validity and APS DOP (Block 24). At this time APS and RPS areas $W_1$ and $W_2$ which are centered about the reported APS and RPS positions of the vehicle, respectively, are also computed (Blocks 25,26). The magnitude of the APS area $W_1$ is equal to a function $W_1$ of APS validity, APS CEP, and RPS validity. The magnitude of the RPS area $W_2$ is equal to a function $W_2$ of RPS validity, RPS CEP and APS validity. It may be noted that, depending on the magnitude and/or nature of the factors on which they depend, either the APS area $W_1$ or the RPS area $W_2$ may comprise an area of zero extent, i.e. be a single point, namely, the APS or RPS reported position of the vehicle. In this case, the question, "do the areas overlap?" (Block 27) means, "is the APS (or RPS) point (position of the vehicle) contained within the RPS (or APS) area?"

After the APS and RPS areas $W_1$ and $W_2$ are computed, a check is made to determine if the RPS area $W_2$ overlaps the APS area $W_1$ (Block 27). If it does, as shown in FIG. 2, it is assumed that the RPS does not require correction and the system 1 is operated to wait said predetermined interval of time (Block 23) and then acquire the then current or new RPS and APS position information (Blocks 20,21). If, on the other hand, the RPS area does not overlap the APS area, the system 1 sets the current RPS computed position of the vehicle to correspond to the current APS computed position of a vehicle and sets the RPS CEP equal to a function $f_2$ of APS validity, APS DOP and RPS validity (Block 28), waits for said predetermined interval of time (Block 23) and then acquires the then current RPS and APS position information (Blocks 20,21).

In Block 22 of FIG. 3 the validity of the APS position information is checked and it may be noted that a number of statistical tests can be used to validate the APS input. The choice of which tests to apply will in general depend on the characteristics of the APS receiver, e.g. a Loran-C, a Global Positioning System (GPS) and the like.

Figure 4:
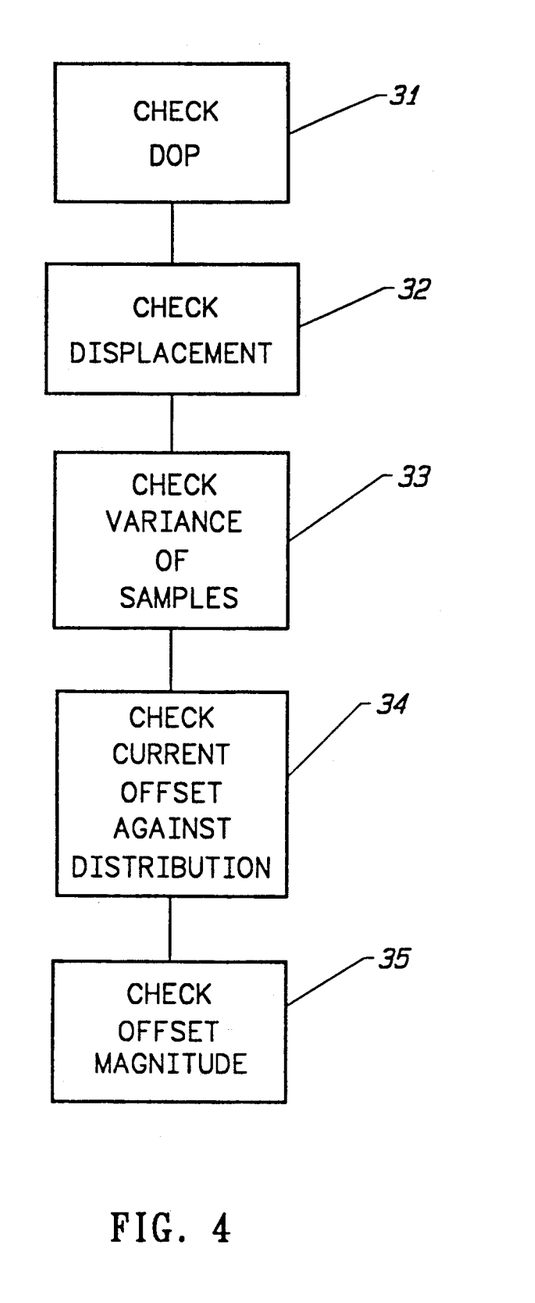
FIG. 4 is a flow diagram of statistical tests of validity for a Loran-C navigation system according to the present invention.

Referring to FIG. 4, there is provided a flow diagram which illustrates a possible selection of statistical tests for an APS such as a Loran receiver.

Block 31 checks that the reported DOP is less than a value that is a function of the data collected from the receiver, such as signal to noise ratio. In its simplest form the value may be a constant. For example, in the case of a Loran receiver that reports DOP in terms of an accuracy number in feet, this constant may be 1000 feet. It may also be a dimensionless number.

Block 32 checks that the displacement between the current reported position and past reported positions is bounded by a value that is a function of data collected from both the APS and RPS systems. This value may be a simple constant that is the maximum displacement between consecutive values of the APS system. For example, it may be 3000 feet. The bound could also be placed on the displacement between the current position and the average position of a number of past samples of the APS system. The bound could also take into account the velocity of the vehicle since the last sample and calculate a bound that represents the maximum displacement plus variability that could be expected in the APS position.

Block 33 checks that the variance (or standard deviation) of the offsets between the APS and RPS positions over a certain number of recent samples is bounded by a value that is a function of the data collected from the APS and RPS systems. For example, this bound could be 500 feet on standard deviation over the most recent 16 samples.

Block 34 checks that current offset between the APS position and the RPS position is reasonable given a certain number of recent samples. In general, the current sample should conform to the expected probability distribution of offset samples. For example, if the probability distribution is assumed to be normal about a mean or average value m with standard deviation s, then one could require that the current offset value fall within a three-standard-deviation range of the mean; that is, that $$abs(o-m) < 3*s$$

where abs is the absolute value function and o is the current offset. Here the value s could be based, a priori, on the probability distribution or it could be computed from the recent sample data. In the latter case, s would change dynamically as the current data changed. Other probability models could be used, depending on what is known about the receiver. In any case, the current offset is validated against the recent data for consistent and expected behavior.

Block 35 checks that the current offset between the APS and RPS systems is bounded by a value that is a function of the data collected from the APS and RPS systems. An unreasonably large value for the offset could indicate a failure of the APS receiver to provide accurate position data. The bound that is placed on the offset may depend on many factors, such as signal to noise ratios, DOP, etc. In its simplest form the bound could be a constant, for example 1 mile.

In the case of a GPS, the current position information is considered valid if at least three satellites were available to acquire the information.

The functions illustrated in Blocks 25, 26 and 28 of FIG. 3 depend on RPS validity, e.g. the validity of a dead reckoning navigation system with map matching. The validity of the RPS is generally a function of whether or not the RPS computes it is lost, i.e. generates a "lost" flag indicator. In a dead reckoning system with map matching, the "lost" flag indicator is typically generated if, while attempting several times to reposition a vehicle to a road, the dead reckoning system is unable to locate an appropriate road which passes through its CEP or area $W_2$. For example, an appropriate road would be one that extends substantially parallel to the vehicle's direction of travel and is near to the vehicle's computed position. Under these conditions, a "lost" flag indicator typically will be generated.

The importance of the presence or absence of an RPS "lost" flag indicator depends on whether the navigation system comprises a Loran-C or a GPS.

At present, Loran-C signal transmission is subject to geographical terrain and other factors which frequently render the position information obtained therefrom unreliable. Accordingly, in the absence of a "lost" flag indicator from the RPS, a system of the present invention comprising a Loran-C will ignore the Loran-C position information and not relocate the RPS. This is done by setting the size of the Loran-C area $W_1$ (Block 25) to infinity, thus insuring that the RPS area $W_2$ will always overlap the APS area $W_1$ (Block 27).

Referring to Block 24, in a navigation system according to the present invention comprising a Loran-C, the computed Loran-C CEP (Block 24) is typically the product of a constant, e.g. 100 feet, and the Loran-C DOP. As noted above, some Loran-C receivers report DOP in units of distance, e.g. feet or meters. This means that such receivers are already reporting an error estimate CEP rather than true DOP. In such cases, the computing of the Loran-C CEP (Block 24) would be adjusted accordingly.

Referring to Block 28 of FIG. 3, past offsets in the Loran-C position information are used to update the RPS computed position of a vehicle. In practice, three sets of the most recent Loran-C offsets are stored. Typically, each set comprises a predetermined number of previous Loran-C offsets, e.g. 30. When the RPS provides a "lost" flag indicator, the average offset in the third previous set of Loran-C offsets is used to relocate the RPS computed position of the vehicle. The reason the third previous set of Loran-C offsetes is used is because it is believed that it comprises more accurate position information than the most recent Loran-C position information. With respect to the resetting of the RPS CEP, the function $f_2$ is typically made equal to the function $f_1$ in Block 24 so that after relocating the vehicle, the Loran-C CEP and the RPS CEP are the same.

In navigation systems comprising a GPS, the setting of the GPS CEP and the GPS area $W_1$ is considerably more complex than in the less precise Loran-C systems.

Figure 5:
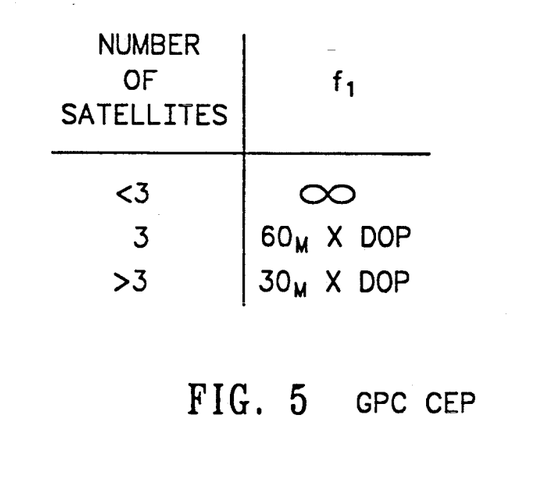
FIG. 5 is a table for computing a GPS CEP according to the present invention.

Referring to FIG. 5, there is shown a table for computing a GPS CEP (Block 24) as a function of the number of satellites available in acquiring the GPS position of the vehicle. As shown in FIG. 5, if the number of satellites available is less than three, the function $f_1$ is infinity. If the number of satellites is equal to three, the function $f_1$ is equal to the product of a first predetermined number, e.g. 60 meters, and GPS DOP. If the number of satellites available is greater than three, the GPS CEP is equal to the product of a second predetermined number, e.g. 30 meters, and GPS DOP. This means that when the number of available satellites exceeds three, the GPS area $W_1$ can be reduced because of the increased precision and reliability of the GPS position information.

Figure 6:
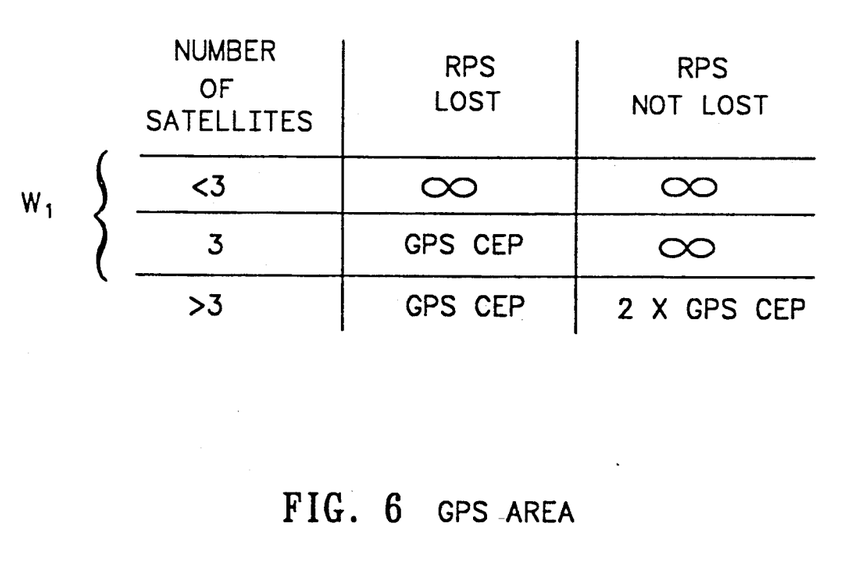
FIG. 6 is a table for computing a GPS area of uncertainty according to the present invention.

Referring to FIG. 6, there is shown a table illustrating the function $W_1$ of GPS validity, GPS CEP and RPS validity. As seen in FIG. 6, if the number of satellites available for obtaining the GPS position information is less than three, the GPS area $W_1$ is infinite when the RPS is lost and when the RPS is not lost. When the number of satellites is equal to three, the GPS area $W_1$ is infinite when the RPS is not lost and is equal to the GPS CEP as determined from the table in FIG. 5 when the RPS is lost. When the number of satellites is greater than three, the GPS area $W_1$ is equal to the GPS CEP as determined from the table in FIG. 5 when the RPS is lost and is twice the GPS CEP when the RPS is not lost. While specific figures have been given for computing the GPS CEP and the GPS area $W_1$, it should be understood that the magnitudes of $f_1$ and $W_1$ can and should be changed from the magnitudes described, depending on the relative precision and reliability of the GPS and RPS systems being used.

Referring to Block 26 in a typical GPS embodiment, the RPS area $W_2$ comprises an area of zero extent, that is, the function $W_2$ is set to a point, i.e. the RPS position of the vehicle.

Referring to Block 28 in a typical GPS embodiment, the function $f_2$ is typically made equal to the function $W_1$ of Block 25.

While a preferred embodiment of the present invention is described above, it is contemplated that numerous modifications may be made thereto for particular applications without departing from the spirit and scope of the present invention. For example, the magnitude or size of the APS CEP, the APS area $W_1$, the RPS area $W_2$ and the setting of the RPS CEP after a relocation of the RPS position all depend variously on APS validity, APS CEP/DOP, RPS validity and R 'S CEP. Each of these factors can be changed depending on the APS and RPS systems employed and on the level of performance desired. Accordingly, it is intended that the embodiment described be considered only as illustrative of the present invention and that the scope thereof should not be limited thereto but be determined by reference to the claims hereinafter provided.

What is claimed is:

1. A method of operating a navigation system comprising a relative positioning system (RPS), said RPS including means for dead reckoning with map matching, and an absolute positioning system (APS) comprising the steps of:

a. acquiring current RPS position information, including information on the validity of the RPS position information, from the RPS;

b. acquiring current APS position information, including information on the validity of the APS position information, from the APS;

c. evaluating the RPS and the APS position information acquired in said steps (a) and (b);

d. updating the RPS position information such that the updated RPS position information is based on the then current APS position information without regard to the then current RPS position information if required by the results of said step (c); and e. repeating said steps (a) through (d).

2. A method of operating a navigation system comprising a relative positioning system (RPS), said RPS including means for dead reckoning with map matching, and an absolute positioning system (APS) comprising the steps of:

a. acquiring current RPS position information, including information on the positional uncertainty of the RPS position information, from the RPS;

b. acquiring current APS position information, including information on the positional uncertainty of the APS position information, from the APS;

c. evaluating the RPS and the APS position information acquired in said steps (a) and (b);

d. updating the RPS position information such that the updated RPS position information is based on the then current APS position information without regard to the then current RPS position information if required by the results of said step (c); and e. repeating said steps (a) through (d).

3. A method according to claim 1 comprising the step of:

f. repeating said steps (a) through (c) if the APS position information is not valid.

4. A method according to claim 1 comprising the step of:

f. relocating the current RPS position of the vehicle to the current APS position of the vehicle if the APS position information is valid.

5. A method according to claim 1 comprising the step of:

f. computing an offset between the RPS position of a vehicle and the APS position of a vehicle; and wherein said step (d) comprises the step of:

g. relocating the current RPS position of the vehicle to the current APS position of the vehicle including the offset computed in step (f) if the APS position information is valid.

6. A method according to claim 1 wherein said step (c) comprises the step of:

f. generating a signal indicating that the current APS position information is valid when:

i. the APS receiver reports that the current reported position of a vehicle is valid;

ii. the current offset between the APS reported position of a vehicle and the current RPS reported position of a vehicle is within a predetermined multiple of the variance of a predetermined number of previous offsets; and iii. the current offset between the current APS position of a vehicle and the current RPS position of the vehicle is less than a predetermined magnitude.

7. A method according to claim 1 wherein said step (a) comprises the steps of:

f. acquiring the current RPS position of a vehicle; and g. acquiring information on the positional uncertainty of the RPS position position of a vehicle; said step (b) comprises the steps of:

h. acquiring the current APS position of a vehicle; and i. acquiring information on the positional uncertainty of the APS position of a vehicle; and said step (d) comprises the steps of:

j. relocating the current RPS position of the vehicle to the current APS position of the vehicle; and k. setting the RPS positional uncertainty of the vehicle to a function $f_2$ of APS validity, APS positional uncertainty of the vehicle, and RPS validity.

8. A method according to claim 1 wherein said step (a) comprises the steps of:

f. acquiring the current RPS position of a vehicle; and g. acquiring the RPS contour of equal probability (CEP); said step (b) comprises the steps of:

h. acquiring the current APS position of a vehicle; and i. acquiring the APS dilution of precision (DOP); and said step (d) comprises the steps of:

j. relocating the current RPS position of the vehicle to the current APS position of the vehicle; and k. setting the RPS contour of equal probability (CEP) equal to a function $f_2$ of APS validity, APS dilution of precision error factor (DOP), and RPS validity.

9. A method according to claim 1 wherein said step (a) comprises the steps of:

f. acquiring the RPS position of a vehicle; and g. acquiring the RPS contour of equal probability (CEP); said step (b) comprises the steps of:

h. acquiring the APS position of a vehicle; and i. acquiring the APS dilution of precision (DOP); said step (c) comprises the steps of:

j. computing an APS CEP as a function $f_1$ of APS validity and an APS dilution of precision error factor (DOP);

k. computing an APS area $W_1$ as a function of APS validity, the APS CEP, and the RPS validity;

l. computing an RPS area $W_2$ as a function of RPS validity, RPS CEP, and APS validity; and m. evaluating whether the RPS area $W_2$ overlaps the APS area $W_1$; and said step (d) comprises the steps of:

n. repeating said steps (a) through (m) when the RPS area $W_2$ overlaps the APS area $W_1$; and o. relocating the current RPS position of a vehicle to the current APS position of a vehicle if the RPS area $W_2$ does not overlap the APS area $W_1$; and p. setting the RPS CEP to a function $f_2$ of APS validity, APS DOP, and RPS validity if the RPS area $W_2$ does not overlap the APS area $W_1$.

10. A method according to claim 6 wherein said step (o) comprises the steps of:

q. computing an offset between the RPS position of a vehicle and the APS position of a vehicle; and r. relocating the current RPS position of the vehicle to the current APS position of the vehicle including the offset computed in said step (q).

11. A method of operating a navigation system comprising a relative positioning system (RPS), said RPS including means for dead reckoning with map matching, and a Loran-C comprising the steps of:

a. acquiring current RPS position information, including information on the validity of the RPS position information, from the RPS;

b. acquiring current Loran-C position information, including information on the validity of the Loran-C position information, from the Loran-C;

c. evaluating the RPS and the Loran-C position information acquired in said steps (a) and (b);

d. updating the RPS position information such that the updated RPS position information is based on the then current Loran-C position information without regard to the then current RPS position information if required by the results of said step (c); and e. repeating said steps (a) through (d).

12. A method of operating a navigation system comprising a relative positioning system (RPS), said RPS including means for dead reckoning with map matching, and a Loran-C comprising the steps of:

a. acquiring current RPS position information, including information on the positional uncertainty of the RPS position information, from the RPS;

b. acquiring current Loran-C position information, including information on the positional uncertainty of the Loran-C position information, from the Loran-C;

c. evaluating the RPS and the Loran-C position information acquired in said steps (a) and (b);

d. updating the RPS position information such that the updated RPS position information is based on the then current Loran-C position information without regard to the then current RPS position information if required by the results of said step (c); and e. repeating said steps (a) through (d).

13. A method according to claim 11 comprising the step of:

f. repeating said steps (a) through (c) if the Loran-C position information is not valid.

14. A method according to claim 11 comprising the step of:

f. relocating the current RPS position of the vehicle to the current Loran-C position of the vehicle if the Loran-C position information is valid.

15. A method according to claim 11 comprising the step of:

f. computing an offset between the RPS position of a vehicle and the Loran-C position of a vehicle; and wherein said step (d) comprises the step of:

g. relocating the current RPS position of the vehicle to the current Loran-C position of the vehicle including the offset computed in step (f) if the Loran-C position information is valid.

16. A method according to claim 11 wherein said step (c) comprises the step of:

f. generating a signal indicating that the current Loran-C position information is valid when:

i. the Loran-C receiver reports that the current reported position of a vehicle is valid;

ii. the current offset between the Loran-C reported position of a vehicle and the current RPS reported position of a vehicle is within a predetermined multiple of the variance of a predetermined number of previous offsets; and iii. the current offset between the current Loran-C position of a vehicle and the current RPS position of the vehicle is less than a predetermined magnitude.

17. A method according to claim 1 wherein said step (a) comprises the steps of:

f. acquiring the current RPS position of a vehicle; and g. acquiring information on the positional uncertainty of the RPS position position of a vehicle; said step (b) comprises the steps of:

h. acquiring the current Loran-C position of a vehicle; and i. acquiring information on the positional uncertainty of the Loran-C position of a vehicle; and said step (d) comprises the steps of:

j. relocating the current RPS position of the vehicle to the current Loran-C position of the vehicle; and k. setting the RPS positional uncertainty of the vehicle to a function $f_2$ of Loran-C validity, Loran-C positional uncertainty of the vehicle, and RPS validity.

18. A method according to claim 1 wherein said step (b) comprises the step of:

f. acquiring current Loran-C position information, including information on the validity of the Loran-C position information, from a Loran-C; and said step (c) comprises the step of:

g. generating a signal indicating that the current Loran-C position information is valid when:

i. the Loran-C receiver reports that the current reported position of a vehicle is valid;

ii. the current offset between the Loran-C reported position of a vehicle and the current RPS reported position of a vehicle is within a predetermined multiple of the variance of a predetermined number of previous offsets; and iii. the current offset between the current Loran-C position of a vehicle and the current RPS position of the vehicle is less than a predetermined magnitude; and h. generating a signal indicating whether or not the RPS is lost; and said step (d) comprises the step of:

i. relocating the current RPS position of a vehicle to the Loran-C position of the vehicle when the Loran-C position information is reported to be valid and the RPS is reported as lost.

19. A method according to claim 1 wherein said step (b) comprises the step of:

f. acquiring current Loran-C position information, including information on the validity of the Loran-C position information, from a Loran-C receiver; and said step (c) comprises the step of:

g. generating a signal indicating that the APS position information is valid when:

i. the Loran-C receiver reports that the current reported position of a vehicle is valid;

ii. the current offset between the Loran-C reported position of a vehicle is within three (3) times the variance of a predetermined number of previous offsets; and iii. the current offset between the current Loran-C position of a vehicle and the current RPS position of the vehicle is less than 1000 feet; and h. generating a signal indicating whether or not the RPS is lost; and said step (d) comprises the step of:

i. relocating the current RPS position of a vehicle to the Loran-C position of the vehicle when the Loran-C position information is reported to be valid and the RPS is reported as lost.

20. A method according to claim 1 wherein said step (a) comprises the steps of:

f. acquiring the RPS position of a vehicle; and g. acquiring the RPS contour of equal probability (CEP); said step (b) comprises the steps of:

h. acquiring the Loran-C position of a vehicle; and i. acquiring the Loran-C dilution of precision (DOP); said step (c) comprises the steps of:

j. computing a Loran-C CEP as a function $f_1$ of Loran-C validity and a Loran-C dilution of precision error factor (DOP);

k. computing a Loran-C area $W_1$ as a function of Loran-C validity, the Loran-C CEP, and the RPS validity;

l. computing an RPS area $W_2$ as a function of RPS validity, RPS CEP, and Loran-C validity; and m. evaluating whether the RPS area $W_2$ overlaps the Loran-C area $W_1$; and said step (d) comprises the steps of:

n. repeating said steps (a) through (m) when the RPS area $W_2$ overlaps the Loran-C area $W_1$ and o. relocating the current RPS position of a vehicle to the current Loran-C position of a vehicle if the RPS area $W_2$ does not overlap the Loran-C area $W_1$; and p. setting the RPS CEP to a function $f_2$ of Loran-C validity, Loran-C DOP, and RPS validity if the RPS area $W_2$ does not overlap the Loran-C area $W_1$.

21. A method according to claim 20 wherein said step (j) comprises the step of:

q. computing a Loran-C CEP as a function of the product of a predetermined constant and the Loran-C DOP.

22. A method according to claim 20 wherein said step (k) and said step (l) comprise the step of:

q. computing Loran-C area $W_1$ and RPS area $W_2$ of zero extent, respectively.

23. A method according to claim 20 wherein said step (p) comprises the step of:

q. setting the RPS CEP to a function $f_2$ which is equal to the function $f_1$ of step (j).

24. A method of operating a navigation system comprising a relative positioning system (RPS), said RPS including means for dead reckoning with map matching, and a Global Position System (GPS) comprising the steps of:

a. acquiring current RPS position information, including information on the validity of the RPS position information, from the RPS;

b. acquiring current GPS position information, including information on the validity of the GPS position information, from the GPS;

c. evaluating the RPS and the GPS position information acquired in said steps (a) and (b);

d. updating the RPS position information such that the updated RPS position information is based on the then current GPS position information without regard to the then current RPS position information if required by the results of said step (c); and e. repeating said steps (a) through (d).

25. A method of operating a navigation system comprising a relative positioning system (RPS), said RPS including means for dead reckoning with map matching, and a Global Positioning System (GPS) comprising the steps of:

a. acquiring current RPS position information, including information on the positional uncertainty of the RPS position information, from the RPS;

b. acquiring current GPS position information, including information on the positional uncertainty of the GPS position information, from the GPS;

c. evaluating the RPS and the GPS position information acquired in said steps (a) and (b);

d. updating the RPS position information such that the updated RPS position information is based on the then current GPS position information without regard to the then current RPS position information if required by the results of said step (c); and e. repeating said steps (a) through (d).

26. A method according to claim 24 comprising the step of:

f. repeating said steps (a) through (c) if the GPS position information is not valid.

27. A method according to claim 25 comprising the step of:

f. relocating the current RPS position of the vehicle to the current GPS position of the vehicle if the GPS position information is valid.

28. A method according to claim 24 comprising the step of:

f. computing an offset between the RPS position of a vehicle and the GPS position of a vehicle; and wherein said step (d) comprises the step of:

g. relocating the current RPS position of the vehicle to the current GPS position of the vehicle including the offset computed in step (f) if the GPS position information is valid.

29. A method according to claim 24 wherein said step (c) comprises the step of:

f. generating a signal indicating that the current GPS position information is valid when:

i. the GPS receiver reports that the current reported position of a vehicle is valid;

ii. the current offset between the GPS reported position of a vehicle and the current RPS reported position of a vehicle is within a predetermined multiple of the variance of a predetermined number of previous offsets; and iii. the current offset between the current GPS position of a vehicle and the current RPS position of the vehicle is less than a predetermined magnitude.

30. A method according to claim 24 wherein said step (a) comprises the steps of:

f. acquiring the current RPS position of a vehicle; and g. acquiring information on the positional uncertainty of the RPS position position of a vehicle; said step (b) comprises the steps of:

h. acquiring the current GPS position of a vehicle; and i. acquiring information on the positional uncertainty of the GPS position of a vehicle; and said step (d) comprises the steps of:

j. relocating the current RPS position of the vehicle to the current GPS position of the vehicle; and k. setting the RPS positional uncertainty of the vehicle to a function $f_2$ of GPS validity, GPS positional uncertainty of the vehicle, and RPS validity.

31. A method according to claim 1 wherein said step (a) comprises the steps of:

f. acquiring the RPS position of a vehicle; and g. acquiring the RPS contour of equal probability (CEP); said step (b) comprises the steps of:

h. acquiring the Global Positioning System (GPS) position of a vehicle; and i. acquiring the GPS dilution of precision (DOP); said step (c) comprises the steps of:

j. computing a GPS CEP as a function $f_1$ of GPS validity and a GPS dilution of precision error factor (DOP);

k. computing a GPS area $W_1$ as a function of GPS validity, the GPS CEP, and the RPS validity;

l. computing an RPS area $W_2$ as a function of RPS validity, RPS CEP, and GPS validity; and m. evaluating whether the RPS area $W_2$ overlaps the GPS area $W_1$; and said step (d) comprises the steps of:

n. repeating said steps (a) through (m) when the RPS area $W_2$ overlaps the GPS area $W_1$ and o. relocating the current RPS position of a vehicle to the current GPS position of a vehicle if the RPS area $W_2$ does not overlap the GPS area $W_1$; and p. setting the RPS CEP to a function $f_2$ of GPS validity, GPS DOP, and RPS validity if the RPS area $W_2$ does not overlap the GPS area W.

32. A method according to claim 1 wherein said step (c) comprises the step of:

s. generating a signal indicating that the GPS position information is invalid when less than three satellites are used to acquire it and valid when three or more satellites are used to acquire it.

33. A method according to claim 31 wherein said step (j) comprises the step of:

s. computing a GPS CEP as a function $f_1$ of the number of satellites used in said step (h).

34. A method according to claim 33 wherein said step (j) comprises the step of:

q. computing a GPS CEP as a function of $f_1$ where $f_1$ is:

i. infinity when the number of satellites is less than 3;

ii. equal to the product of a first predetermined number and the GPS DOP when the number of satellites is equal to 3; and iii. equal to the product of a second predetermined number and the GPS DOP when the number of satellites is greater than 3.

35. A method according to claim 31 wherein said step (c) comprises the step of:

q. acquiring an indication of whether or not said RPS is lost or not lost; said step (j) comprises the step of:

r. computing a (GPS) CEP as a function $f_1$ of the number of satellites used in said step (h); and said step (k) comprises the step of:

s. computing a GPS area $W_1$ as a function of $W_1$ where $W_1$ is:

i. infinity when the number of satellites is less than 3 and there is an indication that the RPS is lost;

ii. infinity when the number of satellites is less than 3 and there is an indication that the RPS is not lost;

iii. equal to the GPS CEP when the number of satellites is equal to three and there is an indication that the RPS is lost;

iv. infinity when the number of satellites is equal to three and there is an indication that the RPS is not lost;

v. equal to the GPS CEP when the number of satellites is greater than three and there is an indication that the RPS is lost; and vi. equal to twice the GPS CEP when the number of satellites is greater than three and there is an indication that the RPS is not lost.

36. A method according to claim 31 wherein said step (l) comprises the step of:

q. computing an RPS area $W_2$ of zero extent.

37. A method according to claim 31 wherein said step (p) comprises the step of:

q. setting a GPS CEP to a function $f_2$ where $f_2$ is equal to the GPS area $W_1$.

38. A navigation system comprising a relative positioning system (RPS), said RPS including means for dead reckoning with map matching, and an absolute positioning system (APS) comprising:

means for acquiring current RPS position information, including information on the validity of the RPS position information, from the RPS;

means for acquiring current APS position information, including information on the validity of the APS position information, from the APS;

means for evaluating said RPS and said APS position information; and means for updating the RPS position information such that the updated RPS position information is based on the then current APS position information without regard to the then current RPS position information if required by said evaluating means.

39. A system according to claim 38 wherein said means for evaluating comprises:

means for acquiring new RPS and APS position information if the current APS position information is not valid.

40. A system according to claim 38 wherein said updating means comprises:

means for relocating the current RPS position of the vehicle to the current APS position of the vehicle if the APS position information is valid.

41. A system according to claim 38 wherein said means for evaluating comprises:

means for computing an offset between the RPS position of a vehicle and the APS position of a vehicle; and said means for updating comprises:

means for relocating the current RPS position of the vehicle to the current APS position of the vehicle including said offset if the APS position information is valid.

42. A method according to claim 38 wherein said means for acquiring said current RPS position information comprises:

means for acquiring the current RPS position of a vehicle; and means for acquiring the RPS contour of equal probability (CEP); said means for acquiring current APS position information comprises:

means for acquiring the current APS position of a vehicle; and means for acquiring the APS dilution of precision (DOP); and said updating means comprises:

means for relocating the current RPS position of the vehicle to the current APS position of the vehicle; and means for setting the RPS contour of equal probability (CEP) equal to a function $f_2$ of APS validity, APS dilution of precision error factor (DOP), and RPS validity.

43. A system according to claim 38 wherein said means for acquiring said current RPS position information comprises:

means for acquiring the RPS position of a vehicle; and means for acquiring the RPS contour of equal probability (CEP); said means for acquiring current APS position information comprises:

means for acquiring the APS position of a vehicle; and means for acquiring the APS dilution of precision (DOP); said evaluating means comprises:

means for computing an APS CEP as a function $f_1$ of APS validity and an APS dilution of precision error factor (DOP);

means for computing an APS area $W_1$ as a function of APS validity, the APS CEP, and the RPS validity;

means for computing an RPS area $W_2$ as a function of RPS validity, RPS CEP, and APS validity; and means for evaluating whether the RPS area $W_2$ overlaps the APS area $W_1$; and said updating means comprises the steps of:

means for acquiring new RPS and APS position information when the RPS area $W_2$ overlaps the APS area $W_1$ and means for relocating the current RPS position of a vehicle to the current APS position of a vehicle if said RPS area $W_2$ does not overlap the APS area $W_1$; and means for setting the RPS CEP to a function $f_2$ of APS validity, APS DOP, and RPS validity if the RPS area $W_2$ does not overlap the APS area $W_1$.

44. A system according to claim 43 wherein said relocating means comprises:

means for computing an offset between the RPS position of a vehicle and the APS position of a vehicle; and means for relocating the current RPS position of the vehicle to the current APS position of the vehicle including said offset.

45. A system according to claim 38 wherein said means for acquiring current APS position information comprises:

means for acquiring current Loran-C position information from a Loran-C; and said evaluating means comprises:

means for generating a signal indicating that the current Loran-C position information is valid when:

i. the Loran-C receiver reports that the current reported position of a vehicle is valid;

ii. the current offset between the Loran-C reported position of a vehicle and the current RPS reported position of a vehicle is within a predetermined multiple of the variance of a predetermined number of previous offsets; and iii. the current offset between the current Loran-C position of a vehicle and the current RPS position of the vehicle is less than a predetermined magnitude; and means for generating a signal indicating whether or not the RPS is lost; and said updating means comprises:

means for relocating the current RPS position of a vehicle to the Loran-C position of the vehicle when the Loran-C position information is reported to be valid and the RPS is reported as not lost.

46. A system according to claim 38 wherein said means for acquiring current APS position information comprises:

means for acquiring current Loran-C position information from a Loran-C; and said evaluating means comprises:

means for generating a signal indicating that the APS position information is valid when:

i. the Loran-C receiver reports that the current reported position of a vehicle is valid;

ii. the current offset between the Loran-C reported position of a vehicle is within three (3) times the variance of a predetermined number of previous offsets; and iii. the current offset between the current Loran-C position of a vehicle and the current RPS position of the vehicle is less than 1000 feet; and means for generating a signal indicating whether or not the RPS is lost; and said updating means comprises:

means for relocating the current RPS position of a vehicle to the Loran-C position of the vehicle when the Loran-C position information is reported to be valid and the RPS is reported as not lost.

47. A system according to claim 38 wherein said means for acquiring said current RPS position information comprises:

means for acquiring the RPS position of a vehicle; and means for acquiring the RPS contour of equal probability (CEP); said means for acquiring current APS position information comprises:

means for acquiring the Loran-C position of a vehicle; and means for acquiring the Loran-C dilution of precision (DOP); said evaluating means comprises:

means for computing a Loran-C CEP as a function $f_1$ of Loran-C validity and a Loran-C dilution of precision error factor (DOP);

means for computing a Loran-C area $W_1$ as a function of Loran-C validity, the Loran-C CEP, and the RPS validity;

means for computing an RPS area $W_2$ as a function of RPS validity, RPS CEP, and Loran-C validity; and means for evaluating whether the RPS area $W_2$ overlaps the Loran-C area $W_1$; and said updating means comprises:

means for acquiring new RPS and APS position information when the RPS area $W_2$ overlaps the Loran-C area $W_1$; and means for relocating the current RPS position of a vehicle to the current Loran-C position of a vehicle if the RPS area $W_2$ does not overlap the Loran-C area $W_1$; and means for setting the RPS CEP to a function $f_2$ of Loran-C validity, Loran-C DOP, and RPS validity if the RPS area $W_2$ does not overlap the Loran-C area $W_1$.

48. A system according to claim 47 wherein said Loran-C CEP computing means comprises:

means for computing a Loran-C CEP as a function of the product of a predetermined constant and the Loran-C DOP.

49. A system according to claim 47 wherein said means for computing said Loran-C and said RPS areas $W_1$ and $W_2$ comprise:

means for computing Loran-C and RPS areas $W_1$ and $W_2$ of zero extent, respectively.

50. A system according to claim 47 wherein said setting means comprises:

means for setting the RPS CEP to a function $f_2$ which is equal to the Loran-C CEP.

51. A system according to claim 38 wherein said means for acquiring said currrrent RPS position information comprises:

means for acquiring the RPS position of a vehicle; and means for acquiring the RPS contour of equal probability (CEP); said means for acquiring current APS position information comprises:

means for acquiring the Global Positioning System (GPS) position of a vehicle; and means for acquiring the GPS dilution of precision (DOP); said evaluating means comprises:

means for computing a GPS CEP as a function $f_1$ of GPS validity and an GPS dilution of precision error factor (DOP);

means for computing a GPS area $W_1$ as a function of GPS validity, the GPS CEP, and the RPS validity;

means for computing an RPS area $W_2$ as a function of RPS validity, RPS CEP, and GPS validity; and means for evaluating whether the RPS area $W_2$ overlaps the GPS area $W_1$; and said updating means comprises:

means for acquiring new RPS and APS position information when the RPS area $W_2$ overlaps the GPS area $W_1$ and means for relocating the current RPS position of a vehicle to the current GPS position of a vehicle if the RPS area $W_2$ does not overlap the GPS area $W_1$; and means for setting the RPS CEP to a function $f_2$ of GPS validity, GPS DOP, and RPS validity if the RPS area $W_2$ does not overlap the GPS area $W_1$.

52. A system according to claim 38 wherein said evaluating means comprises:

means for generating a signal indicating that the GPS position information is invalid when less than three satellites are used to acquire it and valid when three or more satellites are used to acquire it.

53. A system according to claim 51 wherein said means for computing said GPS CEP comprises:

means for computing a GPS CEP as a function $f_1$ of the number of satellites used to acquire said GPS position information.

54. A system according to claim 53 wherein said means for computing said GPS CEP comprises:

means for computing a GPS CEP as a function of $f_1$ where $f_1$ is:

i. infinity when the number of satellites is less than 3;

ii. equal to the product of a first predetermined number and the GPS DOP when the number of satellites is equal to 3; and iii. equal to the product of a second predetermined number and the GPS DOP when the number of satellites is greater than 3.

55. A system according to claim 53 wherein said means for acquiring information on the validity of said RPS position information comprises:

means for acquiring an indication of whether or not said RPS is lost or not lost; said means for computing said GPS CEP comprises:

means for computing a GPS CEP as a function $f_1$ of the number of satellites used in said step (h); and said means for computing said GPS area $W_1$ comprises:

means for computing a GPS area $W_1$ as a function of $W_1$ where $W_1$ is:

i. infinity when the number of satellites is less than 3 and there is an indication that the RPS is lost;

ii. infinity when the number of satellites is less than 3 and there is an indication that the RPS is not lost;

iii. equal to the GPS CEP when the number of satellites is equal to three and there is an indication that the RPS is lost;

iv. infinity when the number of satellites is equal to three and there is an indication that the RPS is not lost;

v. equal to the GPS CEP when the number of satellites is greater than three and there is an indication that the RPS is lost; and vi. equal to twice the GPS CEP when the number of satellites is greater than three and there is an indication that the RPS is not lost.

56. A system according to claim 51 wherein said means for computing an RPS area $W_2$ comprises:

means for computing an RPS area $W_2$ of zero extent.

57. A system according to claim 51 wherein said setting means comprises:

means for setting a GPS CEP to a function $f_2$ where $f_2$ is equal to GPS area $W_1$.

* * * * *

UNITED STATES PATENT AND TRADEMARK OFFICE
CERTIFICATE OF CORRECTION

PATENT NO. : 5,311,195
DATED : May 10, 1994
INVENTOR(S) : Darrell L. Mathis et al.

It is certified that error appears in the above-identified patent and that said Letters Patent is hereby corrected as shown below:

```
Column 8, line 55, "R S CEP" should be --RPS CEP--.
Column 11, line 66, after "claim" change "1" to --11--.
Column 16, line 40, "method" should be --system--.
```

Signed and Sealed this

Sixth Day of September, 1994

Attest:

BRUCE LEHMAN

*Attesting Officer*         *Commissioner of Patents and Trademarks*